(12) United States Patent
Ishitsuka et al.

(10) Patent No.: US 10,738,371 B2
(45) Date of Patent: Aug. 11, 2020

(54) AS-ROLLED TYPE K55 ELECTRIC RESISTANCE WELDED OIL WELL PIPE AND HOT-ROLLED STEEL SHEET

(71) Applicant: NIPPON STEEL & SUMITOMO METAL CORPORATION, Tokyo (JP)

(72) Inventors: Tetsuo Ishitsuka, Tokyo (JP); Takashi Tsusue, Tokyo (JP); Shuji Iwamoto, Tokyo (JP); Shunichi Kobayashi, Tokyo (JP); Toshiyuki Ogata, Tokyo (JP); Osamu Yoshida, Tokyo (JP); Hideto Kawano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 254 days.

(21) Appl. No.: 15/768,691

(22) PCT Filed: Oct. 31, 2016

(86) PCT No.: PCT/JP2016/082340
§ 371 (c)(1),
(2) Date: Apr. 16, 2018

(87) PCT Pub. No.: WO2017/110254
PCT Pub. Date: Jun. 29, 2017

(65) Prior Publication Data
US 2018/0298475 A1  Oct. 18, 2018

(30) Foreign Application Priority Data
Dec. 21, 2015  (JP) .................. 2015-248283

(51) Int. Cl.
| | | |
|---|---|---|
| *C22C 38/18* | (2006.01) | |
| *C22C 38/06* | (2006.01) | |
| *C21D 8/10* | (2006.01) | |
| *B21B 3/02* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *E21B 17/00* | (2006.01) | |
| *B23K 11/16* | (2006.01) | |

(52) U.S. Cl.
CPC ............ *C22C 38/18* (2013.01); *B21B 3/02* (2013.01); *C21D 8/0205* (2013.01); *C21D 8/0226* (2013.01); *C21D 8/10* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *E21B 17/00* (2013.01); *B23K 11/16* (2013.01); *C21D 2211/005* (2013.01); *C21D 2211/009* (2013.01)

(58) Field of Classification Search
CPC ..... B21B 3/02; B23K 11/16; C21D 2211/005; C21D 2211/009; C21D 8/0205; C21D 8/0226; C21D 8/10; C21D 9/46; C22C 38/001; C22C 38/002; C22C 38/02; C22C 38/04; C22C 38/06; C22C 38/08; C22C 38/12; C22C 38/14; C22C 38/16; C22C 38/18; E21B 17/00
See application file for complete search history.

(56) References Cited

U.S. PATENT DOCUMENTS

| | | |
|---|---|---|
| 2013/0092280 A1 | 4/2013 | Sawamura et al. |
| 2015/0068638 A1 | 3/2015 | Matsuki et al. |
| 2015/0368768 A1* | 12/2015 | Aratani ................ C22C 38/005 420/83 |

FOREIGN PATENT DOCUMENTS

| | | |
|---|---|---|
| EP | 2952601 A1 | 12/2015 |
| JP | 57-145928 A | 9/1982 |
| JP | 61-48518 A | 3/1986 |
| JP | 61-221331 A | 10/1986 |
| JP | 62-89813 A | 4/1987 |

(Continued)

OTHER PUBLICATIONS

Chinese Office Action for Chinese Application No. 201680059662.3, dated Jul. 4, 2019, with an English translation.

(Continued)

*Primary Examiner* — Jenny R Wu
(74) *Attorney, Agent, or Firm* — Birch, Stewart, Kolasch & Birch, LLP (57) ABSTRACT

An as-rolled type K55 electric resistance welded oil well pipe includes, in terms of % by mass, 0.30 to 0.50% of C, 0.05 to 0.40% of Si, 0.50 to 1.20% of Mn, 0 to 0.030% of P, 0 to 0.020% of S, 0.002 to 0.080% of Al, 0 to 0.0080% of N, 0 to 0.30% of Cu, 0 to 0.30% of Ni, 0 to 0.30% of Cr, 0 to 0.10% of Mo, 0 to 0.10% of V, 0 to 0.050% of Nb, 0 to 0.030% of Ti, 0 to 0.0100% of Ca, and the balance being Fe and impurities. In the pipe, a metallographic structure at a position of ¼ of a pipe thickness in an L cross-section at a base metal 90° position is a ferrite-pearlite structure in which prior γ-grains are flattened, includes grain boundary ferrite and intragranular ferrite, and has a rate of a total area of the grain boundary ferrite and the intragranular ferrite, of 10 to 30%.

12 Claims, 2 Drawing Sheets

(56) References Cited

FOREIGN PATENT DOCUMENTS

| JP | 63-247311 A | 10/1988 |
|---|---|---|
| JP | 7-102321 A | 4/1995 |
| JP | 2003-193198 A | 7/2003 |
| JP | 2008-208454 A | 9/2008 |
| JP | 2011-89152 A | 5/2011 |
| JP | 2012-132060 A | 7/2012 |
| WO | WO 2012/144248 A1 | 10/2012 |
| WO | WO 2013/153676 A1 | 10/2013 |

OTHER PUBLICATIONS

Guoan et al., "Microstructure Evolution of Medium Carbon Steel During Deformation of Undercooled Austenite," Acta Metallurgica Sinica, vol. 43, No. 1, Jan. 2007, pp. 27-34, with an English abstract.
Wang et al., "Metal Plasticity Processing—Theory of Rolling and Process," 9.2.3: Controlled Rolling of Steel Material, Yakin Kogyo Shuppansha, Jun. 30, 2012, pp. 144-146.
International Search Report for PCT/JP2016/082340 dated Jan. 24, 2017.
Written Opinion of the International Searching Authority for PCT/JP2016/082340 (PCT/ISA/237) dated Jan. 24, 2017.
Extended European Search Report, dated May 9, 2019, for corresponding European Application No. 16878152.4.

* cited by examiner

AS-ROLLED TYPE K55 ELECTRIC RESISTANCE WELDED OIL WELL PIPE AND HOT-ROLLED STEEL SHEET

TECHNICAL FIELD

The present disclosure relates to an as-rolled type K55 electric resistance welded oil well pipe and a hot-rolled steel sheet.

BACKGROUND ART

Among steel pipes for electric resistance welded oil well pipes, API 5CT K55 (hereinafter may be simply referred to as "K55") is a steel pipe that satisfies TS (tensile strength) >655 N/mm$^2$ and YS (yield strength)=from 379 to 552 N/mm$^2$, and API 5CT J55 (hereinafter may be simply referred to as "J55") is a steel pipe that satisfies TS>517 N/mm$^2$ and YS=level equivalent to YS of K55. K55 has a feature in that the yield ratio (YR) of K55 is lower than that of J55 (for example, YR of K55 is less than 80%) because the lower limit of TS of K55 is higher than that of J55.

The following Patent Documents 1 to 6 describe K55 or steel sheets used in K55.
Patent Document 1: Japanese Patent Application Laid-Open (JP-A) No. H07-102321
Patent Document 2: International Publication No. WO 2012/144248
Patent Document 3: JP-A No. S61-048518
Patent Document 4: JP-A No. 2011-089152
Patent Document 5: JP-A No. 2012-132060
Patent Document 6: International Publication No. WO 2013/153676

SUMMARY OF INVENTION

Technical Problem

As the K55 described above, an as-hot-rolled seamless steel pipe can be relatively easily produced using a steel including 0.4 to 0.5% by mass of C and having a ferrite-pearlite structure.

However, it has been conventionally difficult to produce, as K55, an as-rolled type electric resistance welded steel pipe which can be more inexpensively produced than the seamless steel pipe, by the following reasons.

Herein, the as-rolled type electric resistance welded steel pipe refers to an electric resistance welded steel pipe that is produced by cold forming an as-hot-rolled steel sheet in a pipe shape and that is not subjected to other heat treatment than seam heat treatment after the cold forming (pipe making).

A process of producing an as-rolled type electric resistance welded steel pipe includes a stage of cold forming a hot-rolled steel sheet as a material in a pipe shape. The yield strength (YS) of a steel material is greatly increased by the cold forming. Therefore, preparation of, as a material (hot-rolled steel sheet), a hot-rolled steel sheet of which the YS is much lower than that of the target (as-rolled type electric resistance welded steel pipe), in consideration of an increase in YS in the cold forming, is required for producing the as-rolled type electric resistance welded steel pipe which is K55 having comparatively low YS.

However, it has been conventionally difficult to prepare a hot-rolled steel sheet having low YS, by the following reasons.

A process of producing a hot-rolled steel sheet (hot coil) includes each stage of hot rolling, cooling on a run out table (ROT) just after the hot rolling, and coiling. In the process of producing the hot-rolled steel sheet, it is necessary to increase a cooling rate on the ROT from the viewpoint of the productivity of the hot-rolled steel sheet (i.e., reduction in production cost). In the process of producing the hot-rolled steel sheet, it has been difficult to sufficiently produce ferrite having the function of decreasing YS in the structure of the hot-rolled steel sheet because of a high cooling rate just after the hot rolling.

By the above reasons, it has been conventionally difficult to prepare a hot-rolled steel sheet having low YS.

In recent years, it has been demanded to produce an electric resistance welded oil well pipe that can be produced using a steel sheet for K55 and that can be used as is upon having been cold-formed (pipe-made) (i.e., in the state of not being subjected to other heat treatment than seam heat treatment after pipe making), from the viewpoint of reducing the cost of drilling an oil well or a gas well. In other words, an oil well pipe that is K55 and that is an as-rolled type electric resistance welded steel pipe (hereinafter referred to as an "as-rolled type K55 electric resistance welded oil well pipe") has been demanded.

Even in a case in which an as-rolled type K55 electric resistance welded oil well pipe can be produced, the produced as-rolled type K55 electric resistance welded oil well pipe requires base metal toughness (for example, Charpy impact energy).

An object of one embodiment of the present disclosure is to provide an as-rolled type K55 electric resistance welded oil well pipe having excellent base metal toughness and a hot-rolled steel sheet preferred for producing the as-rolled type K55 electric resistance welded oil well pipe.

Solution to Problem

The means for achieving the object includes the following aspects.
<1> An as-rolled type K55 electric resistance welded oil well pipe having a chemical composition consisting of, in terms of % by mass:
from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance being Fe and impurities,
wherein a Mn equivalent defined in the following Equation (1) is from 0.50 to 1.20:

$$\text{Mn equivalent} = ([\text{Mn}]/6 + [\text{Cu}]/15 + [\text{Ni}]/15 + [\text{Cr}]/5 + [\text{Mo}]/5 + [\text{V}]/5) \times 6 \qquad (1)$$

wherein, in Equation (1), [Mn], [Cu], [Ni], [Cr], [Mo], and [V] represent % by mass of Mn, Cu, Ni, Cr, Mo, and V, respectively, and wherein a metallographic structure, at a position to which a distance from a pipe outer surface is ¼ of a pipe thickness in an L cross-section at a position deviating at 90° in a circumferential direction from an electric resistance welded zone, is a ferrite-pearlite structure in which prior austenite grains are flattened, comprises grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%.

<2> The as-rolled type K55 electric resistance welded oil well pipe according to <1>, wherein the prior austenite grains have an aspect ratio of 3.0 or more.

<3> The as-rolled type K55 electric resistance welded oil well pipe according to <1> or <2>, wherein a tensile strength in an L direction is 655 N/mm² or more, and a yield strength in the L direction is from 379 to 530 N/mm².

<4> The as-rolled type K55 electric resistance welded oil well pipe according to any one of <1> to <3>,
wherein the chemical composition comprises, in terms of % by mass, one or more of:
from more than 0 to 0.30% of Cu,
from more than 0 to 0.30% of Ni,
from more than 0 to 0.30% of Cr,
from more than 0 to 0.10% of Mo,
from more than 0 to 0.10% of V,
from more than 0 to 0.050% of Nb,
from more than 0 to 0.030% of Ti, or
from more than 0 to 0.0100% of Ca, and
wherein, in the chemical composition, the Mn equivalent is from 0.70 to 1.20.

<5> A hot-rolled steel sheet used for producing the as-rolled type K55 electric resistance welded oil well pipe according to any one of <1> to <4>, the hot-rolled steel sheet having a chemical composition consisting of, in terms of % by mass:
from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance being Fe and impurities,
wherein the Mn equivalent is from 0.50 to 1.20,
wherein a metallographic structure, at a position to which a distance from a sheet surface is ¼ a sheet thickness in an L cross-section is a ferrite-pearlite structure in which prior austenite grains are flattened, includes grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%, and
wherein a tensile strength in an L direction is 640 N/mm² or more, and a yield strength in an L direction is from 294 to 467 N/mm².

Advantageous Effects of Invention

According to one embodiment of the present disclosure, an as-rolled type K55 electric resistance welded oil well pipe having excellent base metal toughness and a hot-rolled steel sheet preferred for producing the as-rolled type K55 electric resistance welded oil well pipe are provided.

DESCRIPTION OF EMBODIMENTS

A numerical range expressed by "x to y" herein includes the values of x and y in the range as the lower and upper limits, respectively.

The content of a component (element) expressed by "%" herein means "% by mass".

The content of C (carbon) may be herein occasionally expressed as "C content". The content of another element may be expressed similarly.

The concept of "oil well pipe" herein encompasses both of a steel pipe used in an oil well and a steel pipe used in a gas well.

The term "step" herein encompasses not only an independent step but also a step of which the desired object is achieved even in a case in which the step is incapable of being definitely distinguished from another step.

[As-Rolled Type K55 Electric Resistance Welded Oil Well Pipe]

An as-rolled type K55 electric resistance welded oil well pipe of the present disclosure (hereinafter also referred to as "electric resistance welded oil well pipe of the present disclosure") is an as-rolled type K55 electric resistance welded oil well pipe having a chemical composition consisting of, in terms of % by mass:
from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni, from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance being Fe and impurities,
wherein a Mn equivalent defined in the following Equation (1) is from 0.50 to 1.20:

$$\text{Mn equivalent} = ([Mn]/6 + [Cu]/15 + [Ni]/15 + [Cr]/5 + [Mo]/5 + [V]/5) \times 6 \quad (1)$$

wherein in Equation (1), [Mn], [Cu], [Ni], [Cr], [Mo], and [V] represent % by mass of Mn, Cu, Ni, Cr, Mo, and V, respectively, and wherein a metallographic structure at a position to which the distance from a pipe outer surface is ¼ of a pipe thickness in an L cross-section at a position deviating at 90° in a circumferential direction from an electric resistance welded zone is a ferrite-pearlite structure in which prior austenite grains are flattened, includes grain boundary ferrite which is ferrite present in the grain boundary of the prior austenite grains and intragranular ferrite which is ferrite present within the prior austenite grains, and has a rate of the total area of the grain boundary ferrite and the intragranular ferrite with respect to the total area of the metallographic structure, of from 10 to 30%.

In the present specification, the as-rolled type K55 electric resistance welded oil well pipe means an oil well pipe that is K55 and an as-rolled type electric resistance welded steel pipe as described above, i.e., an oil well pipe that is an as-rolled type electric resistance welded steel pipe that satisfies TS (tensile strength)>655 N/mm$^2$ and YS (yield strength)=from 379 to 552 N/mm$^2$.

In the present specification, TS (tensile strength) means TS in an L direction, and YS (yield strength) means 0.5% under load proof stress in an L direction.

In the present specification, an L cross-section of a steel pipe (for example, electric resistance welded oil well pipe) means a cross section, taken along the plane parallel to each of a pipe longitudinal direction and a pipe thickness direction, of the steel pipe, and an L cross-section of a steel sheet (for example, hot-rolled steel sheet) means a cross section, taken along the plane parallel to each of a sheet longitudinal direction and a sheet thickness direction, of the steel sheet.

In the present specification, the L direction of a steel pipe (for example, electric resistance welded oil well pipe) means the pipe longitudinal direction of the steel pipe, and the L direction of a steel sheet (for example, hot-rolled steel sheet) means the sheet longitudinal direction of the steel sheet.

In the electric resistance welded oil well pipe of the present disclosure, a combination of the chemical composition and the metallographic structure allows TS and YS of K55 (i.e., TS>655 N/mm$^2$ and YS=from 379 to 552 N/mm$^2$) to be achieved and excellent base metal toughness to be secured.

In the present specification, base metal toughness is evaluated based on Charpy absorbed energy. The greater the Charpy absorbed energy is, the higher the base metal toughness is.

The chemical composition of the electric resistance welded oil well pipe of the present disclosure (hereinafter also referred to as "chemical composition in the present disclosure") and preferred embodiments thereof will now be described below.

C: 0.30 to 0.50%

C is an element required for securing desired tensile strength. From 0.30 to 0.50% of C is a condition required for obtaining a desired ferrite-pearlite structure (specifically, a ferrite-pearlite structure that satisfies the above-described the rate of the total area).

Because a C content of less than 0.30% does not enable desired tensile strength to be obtained, the C content is set at 0.30% or more. The C content is preferably 0.34% or more.

Because a C content of more than 0.50% results in an excessive increase in yield strength, thereby deteriorating base metal toughness, and results in the deterioration of the toughness of a heat affected zone, the C content is set at 0.50% or less. The C content is preferably 0.47% or less.

Si: 0.05 to 0.40%

Si is not only a deoxidization element but also an element that contributes to improvement in strength due to solid solution strengthening.

Because a Si content of less than 0.05% causes such effects to be insufficiently obtained, the Si content is set at 0.05% or more. The Si content is preferably 0.10% or more, and more preferably 0.15% or more.

Because a Si content of more than 0.40% results in the generation of a Si-containing oxide to be generated in electric resistance welding, the deterioration of the quality of an electric resistance welded zone, and the deterioration of the toughness of a heat affected zone, the Si content is set at 0.40% or less. The Si content is preferably 0.35% or less, and more preferably 0.30% or less.

In the present specification, the mere term with "strength" means at least one of tensile strength (TS) or yield strength (YS).

Mn: 0.50 to 1.20%

Mn is an element that improves hardenability to contribute to formation of a desired ferrite-pearlite structure (described later) and improvement in strength, and that forms MnS to fix S, thereby suppressing cracking of a slab in casting. Because a Mn content of less than 0.50% causes such effects to be insufficiently obtained, the Mn content is set at 0.50% or more. The Mn content is preferably 0.70% or more.

Because a Mn content of more than 1.20% results in segregation, thereby deteriorating base metal toughness, the Mn content is set at 1.20% or less. The Mn content is preferably 1.10% or less.

From the viewpoint of further improving the base metal toughness, the Mn content is still more preferably 1.00% or less, and particularly preferably less than 1.00%.

P: 0 to 0.030%

P is an impurity element that can segregate in a grain boundary, thereby deteriorating base metal toughness.

Because a P content of more than 0.030% results in the considerable deterioration of base metal toughness, the P content is set at 0.030% or less. The P content is preferably 0.016% or less.

The P content may be 0%. From the viewpoint of a production cost, the P content is preferably 0.001% or more.

S: 0 to 0.020%

S is an impurity element that inhibits base metal toughness and that forms MnS, thereby deteriorating the base metal toughness and seam zone toughness. Because a S content of more than 0.020% results in the considerable deterioration of base metal toughness, the S content is set at 0.020% or less. The S content is preferably 0.010% or less.

The S content may be 0%. From the viewpoint of a production cost, the S content is preferably 0.0005% or more.

Al: 0.002 to 0.080%

Al is an element that functions as a deoxidizer. Because an Al content of less than 0.002% causes such an effect to be insufficiently obtained, the Al content is set at 0.002% or more. The Al content is preferably 0.007% or more.

Because an Al content of more than 0.080% results in generation of a large amount of oxide, thereby inhibiting the cleanliness of a steel, the Al content is set at 0.080% or less. The Al content is preferably 0.050% or less.

N: 0 to 0.0080%

N is an impurity element and is an element that inhibits formability in the case of forming a hot-rolled steel sheet in a pipe shape, by aging. Because a N content of more than 0.0080% results in the considerable deterioration of the formability, the N content is set at 0.0080% or less. The N content is preferably 0.0060% or less, and more preferably 0.0040% or less.

The N content may be 0%. From the viewpoint of a production cost, the N content is preferably 0.0005% or more.

Cu: 0 to 0.30%

Cu is an optional element. Therefore, the content of Cu may be 0%.

Cu is an element that contributes to strength improvement by solid solution strengthening or precipitation strengthening. From the viewpoint of more effectively obtaining such an effect, the Cu content is preferably more than 0%, and more preferably 0.05% or more.

Because a Cu content of more than 0.30% results in the deterioration of hot workability, the Cu content is set at 0.30% or less. The Cu content is preferably 0.15% or less.

Ni: 0 to 0.30%

Ni is an optional element. Therefore, the content of Ni may be 0%.

Ni is an element that contributes to improvement in base metal toughness. From the viewpoint of more effectively obtaining such an effect, the Ni content is preferably more than 0%, and more preferably 0.05% or more.

Because a Ni content of more than 0.30% results in the deterioration of weldability and an increase in material cost, the Ni content is set at 0.30% or less. The Ni content is preferably 0.15% or less.

Cr: 0 to 0.30%

Cr is an optional element. Therefore, the content of Cr may be 0%.

Cr is an element that improve hardenability and that contributes to improvement in strength. From the viewpoint of more effectively obtaining such effects, the Cr content is preferably more than 0%, and more preferably 0.05% or more.

Because a Cr content of more than 0.30% may induce a weld defect in electric resistance welding, the Cr content is set at 0.30% or less. The Cr content is preferably 0.15% or less.

Mo: 0 to 0.10%

Mo is an optional element. Therefore, the content of Mo may be 0%.

Mo is an element that forms a carbonitride to contribute to improvement in strength. From the viewpoint of more effectively obtaining such effects, the Mo content is preferably more than 0%, and more preferably 0.01% or more.

Because a Mo content of more than 0.10% results in generation of a large amount of carbide, thereby deteriorating base metal toughness, the Mo content is set at 0.10% or less. The Mo content is preferably 0.05% or less.

V: 0 to 0.10%

V is an optional element. Therefore, the content of V may be 0%.

V is an element that forms a fine carbonitride to contribute to improvement in strength without deteriorating weldability. From the viewpoint of more effectively obtaining such effects, the V content is preferably more than 0%, and more preferably 0.01% or more.

Because a V content of more than 0.10% results in generation of a large amount of carbonitride, thereby increasing not only a yield ratio but also a material cost, the V content is set at 0.10% or less. The V content is more preferably 0.05% or less.

Nb: 0 to 0.050%

Nb is an optional element. Therefore, the content of Nb may be 0%.

Nb is an element that contributes to micronization of crystal grains and that also contributes to improvement in toughness. From the viewpoint of more effectively obtaining such effects, the Nb content is preferably more than 0%, and more preferably 0.001% or more.

Because a Nb content of more than 0.050% results in an increase in yield ratio due to micronization, the Nb content is set at 0.050% or less. The Nb content is preferably 0.030% or less, and more preferably 0.020% or less.

Ti: 0 to 0.030%

Ti is an optional element. Therefore, the content of Ti may be 0%.

Ti is an element that contributes to micronization of crystal grains. From the viewpoint of more effectively obtaining such an effect, the Ti content is preferably more than 0%, and more preferably 0.001% or more.

Because a Ti content of more than 0.030% may result in generation of coarse precipitates, thereby deteriorating base metal toughness, the Ti content is set at 0.030% or less. The Ti content is preferably 0.020% or less.

Ca: 0 to 0.0100%

Ca is an optional element. Therefore, the content of Ca may be 0%.

Ca is an element that allows a coarse sulfide to be spherical and that contributes to improvement in base metal toughness. From the viewpoint of more effectively obtaining such effects, the Ca content is preferably more than 0%, and more preferably 0.0010% or more.

Because a Ca content of more than 0.0100% may result in a decrease in the cleanliness of a steel and in stretching of a coarse Ca oxide on an electric resistance welded abutment surface, thereby deteriorating electric resistance welded zone characteristics, the Ca content is set at 0.0100% or less. The Ca content is more preferably 0.0050% or less.

Mn Equivalent: from 0.50 to 1.20

In the chemical composition in the present disclosure, a Mn equivalent defined in the following Equation (1) is from 0.50 to 1.20.

$$\text{Mn equivalent} = ([\text{Mn}]/6 + [\text{Cu}]/15 + [\text{Ni}]/15 + [\text{Cr}]/5 + [\text{Mo}]/5 + [\text{V}]/5) \times 6 \quad (1)$$

In Equation (1), [Mn], [Cu], [Ni], [Cr], [Mo], and [V] represent % by mass of Mn, Cu, Ni, Cr, Mo, and V, respectively.

The Mn equivalent is an index indicating the hardenability of a steel.

Because a Mn equivalent of less than 0.50 makes it impossible to obtain a desired ferrite-pearlite structure (described later), the Mn equivalent is set at 0.50 or more. The Mn equivalent is preferably 0.70 or more, and more preferably 0.90 or more.

Because a Mn equivalent of more than 1.20 results in excessive improvement in hardenability, thereby excessively increasing strength, the Mn equivalent is set at 1.20 or less. The Mn equivalent is preferably 1.10 or less.

From the viewpoint of further improving base metal toughness, the Mn equivalent is still more preferably 1.00 or less, and particularly preferably less than 1.00.

From the viewpoint if obtaining the effects provided by the optional elements described above, the chemical composition of the electric resistance welded oil well pipe of the present disclosure may include one or more of from more than 0 to 0.30% of Cu, from more than 0 to 0.30% of Ni, from more than 0 to 0.30% of Cr, from more than 0 to 0.10% of Mo, from more than 0 to 0.10% of V, from more than 0 to 0.050% of Nb, from more than 0 to 0.030% of Ti, and from more than 0 to 0.0100% of Ca.

The Mn equivalent in such a case is preferably from 0.70 to 1.20. In the case, still more preferred embodiments of the upper and lower limit of the Mn equivalent are described above.

Balance: Fe and Impurities

In the chemical composition of the electric resistance welded oil well pipe of the present disclosure, the balance after excluding the above-described elements is Fe and impurities.

An impurity herein means a component contained in a source material or a component that is mixed into a steel in a production step and that is not allowed to be intentionally contained in the steel.

Examples of impurities include any other elements than the elements described above. The kinds of elements as the impurities may be single, or may be two or more.

Examples of the impurities include O, B, Sb, Sn, W, Co, As, Mg, Pb, Bi, H, and REM. Herein, "REM" refers to a rare earth element, i.e., at least one element selected from the group consisting of Sc, Y, La, Ce, Pr, Nd, Pm, Sm, Eu, Gd, Tb, Dy, Ho, Er, Tm, Yb, and Lu.

Among the elements, O is preferably controlled to be in a content of 0.006% or less.

With regard to the other elements, typically, Sb, Sn, W, Co, and As may be mixed in a content of 0.1% or less, Mg, Pb, and Bi may be mixed in a content of 0.005% or less, B may be mixed in a content of 0.0003% or less, and H may be mixed in a content of 0.0004% or less; however, the contents of the other elements need not be particularly controlled as long as being in a usual range.

The metallographic structure of the electric resistance welded oil well pipe of the present disclosure and a preferred embodiment thereof will now be described.

In the electric resistance welded oil well pipe of the present disclosure, a metallographic structure at a position of ¼ of a pipe thickness in an L cross-section at the base metal 90° position is a ferrite-pearlite structure in which prior γ-grains (i.e., prior austenite grains) are flattened, includes grain boundary ferrite which is ferrite present in the grain boundary of the prior γ-grains and intragranular ferrite which is ferrite present within the prior γ-grains, and has a rate of a total area of the grain boundary ferrite and the intragranular ferrite with respect to a total area of the metallographic structure (i.e., the ferrite-pearlite structure) (hereinafter also referred to as "total area rate T"), of from 10 to 30%.

The electric resistance welded oil well pipe of the present disclosure has the above-described chemical composition in the present disclosure and has the metallographic structure, thereby allowing TS and YS of K55 to be achieved and excellent base metal toughness to be secured.

Herein, the base metal 90° position means a position deviating at 90° in a circumferential direction from an electric resistance welded zone in the electric resistance welded oil well pipe, and the position of ¼ of a pipe thickness means a position to which the distance from a pipe outer surface is ¼ of a pipe thickness.

Because a total area rate T (i.e., a rate of a total area of the grain boundary ferrite and intragranular ferrite with respect to a total area of the metallographic structure) of less than 10% results in an excessive increase in YS (specifically, YS of more than 552 N/mm$^2$) and the degradation of base metal toughness, the total area rate T is 10% or more. The total area rate T is preferably 15% or more.

Because a total area rate T of more than 30% results in an excessive decrease in TS (specifically, TS of less than 655 N/mm$^2$), the total area rate T is 30% or less. The total area rate T is preferably 25% or less.

Herein, "metallographic structure (i.e., ferrite-pearlite structure) contains intragranular ferrite" means that intragranular ferrite (i.e., ferrite present within prior γ-grain) is substantially present in a metallographic structure.

Specifically, in a case in which the area rate of intragranular ferrite with respect to the total area of the intragranular ferrite and grain boundary ferrite (hereinafter also simply referred to as "area rate of intragranular ferrite") is 10% or more in a metallographic structure, the metallographic structure can be considered to include the intragranular ferrite (i.e., the intragranular ferrite is substantially present in the metallographic structure).

The grain boundary ferrite is ferrite that is naturally present in the grain boundary of prior γ-grains. In other words, the ferrite-pearlite structure naturally includes grain boundary ferrite.

Because a case in which the metallographic structure includes no intragranular ferrite results in an excessive increase in YS (specifically, YS of more than 552 N/mm$^2$) and the degradation of base metal toughness, the metallographic structure includes intragranular ferrite (i.e., the area rate of the intragranular ferrite with respect to the total area of the intragranular ferrite and grain boundary ferrite is 10% or more). The area rate of the intragranular ferrite is preferably 15% or more.

The upper limit of the area rate of the intragranular ferrite is not particularly restricted. From the viewpoint of production suitability, the area rate of the intragranular ferrite is preferably 50% or less.

"Metallographic structure includes intragranular ferrite" means that ferrite transformation proceeds in prior γ-grains, and a ferrite-pearlite structure in which ferrite is finely dispersed is formed, in a hot-rolling step of producing a hot-rolled steel sheet which is the material of an electric resistance welded oil well pipe. Such a structure allows the mechanical characteristics of K55 (particularly, YS of 552 N/mm$^2$ or less) to be achieved and base metal toughness to be improved.

A preferred embodiment of the hot-rolling step will be described later.

In the present specification, a total area rate T and the presence or absence of intragranular ferrite (i.e., area rate of intragranular ferrite) are determined based on an image-processed metallographic micrograph obtained by carrying out image processing of a metallographic micrograph of an L cross-section at the base metal 90° position of an electric resistance welded oil well pipe.

The aspect ratio of prior γ-grains described later is similar.

In addition, "the metallographic structure in the electric resistance welded oil well pipe is a ferrite-pearlite structure in which prior γ-grains are flattened" means that a cumulative reduction rate in an austenite unrecrystallization temperature range in a hot-rolling step of a hot-rolled steel sheet, which is the material of the electric resistance welded oil well pipe, is higher (for example, a cumulative reduction rate in a temperature range of 830° C. or less is 35% or more) than that under ordinary conditions, and that a rolling finishing temperature is lower (for example, 750° C. or less) than that under ordinary conditions.

The degree of the flatness of the prior γ-grains in the ferrite-pearlite structure in the electric resistance welded oil well pipe corresponds to the cumulative reduction rate in the austenite unrecrystallization temperature range in the hot-rolling step of producing the hot-rolled steel sheet which is the material of the electric resistance welded oil well pipe. The higher the cumulative reduction rate in the austenite unrecrystallization temperature range is, the higher the degree of the flatness of the prior γ-grains is.

A preferred embodiment of the hot-rolling step will be described later.

The aspect ratio of the prior γ-grains in the ferrite-pearlite structure in the electric resistance welded oil well pipe is preferably 3.0 or more, and more preferably 3.5 or more.

The aspect ratio of the prior γ-grains corresponds to the degree of the flatness of the prior γ-grains. The higher the aspect ratio of the prior γ-grains is, the higher the degree of the flatness of the prior γ-grains is.

The upper limit of the aspect ratio of the prior γ-grains is not particularly restricted. From the viewpoint of the production suitability of the hot-rolled steel sheet which is the material of the electric resistance welded oil well pipe, the aspect ratio of the prior γ-grains is preferably 20 or less.

The aspect ratio of the prior γ-grains means the arithmetic mean value of the major axis diameter/minor axis diameter ratios of 20 prior γ-grains, determined as described below.

With regard to each of 20 prior γ-grains, the ratio of the major axis diameter of the inscribed ellipse of the prior γ-grain to the minor axis diameter of the inscribed ellipse of the prior γ-grain (major axis diameter/minor axis diameter ratio) is measured in a metallographic micrograph of an L cross-section at the base metal 90° position of the electric resistance welded oil well pipe. The arithmetic mean value of the measurement values (arithmetic mean value of major axis diameter/minor axis diameter ratios of 20 prior γ-grains) is regarded as the aspect ratio of the prior γ-grains.

Figure 1:
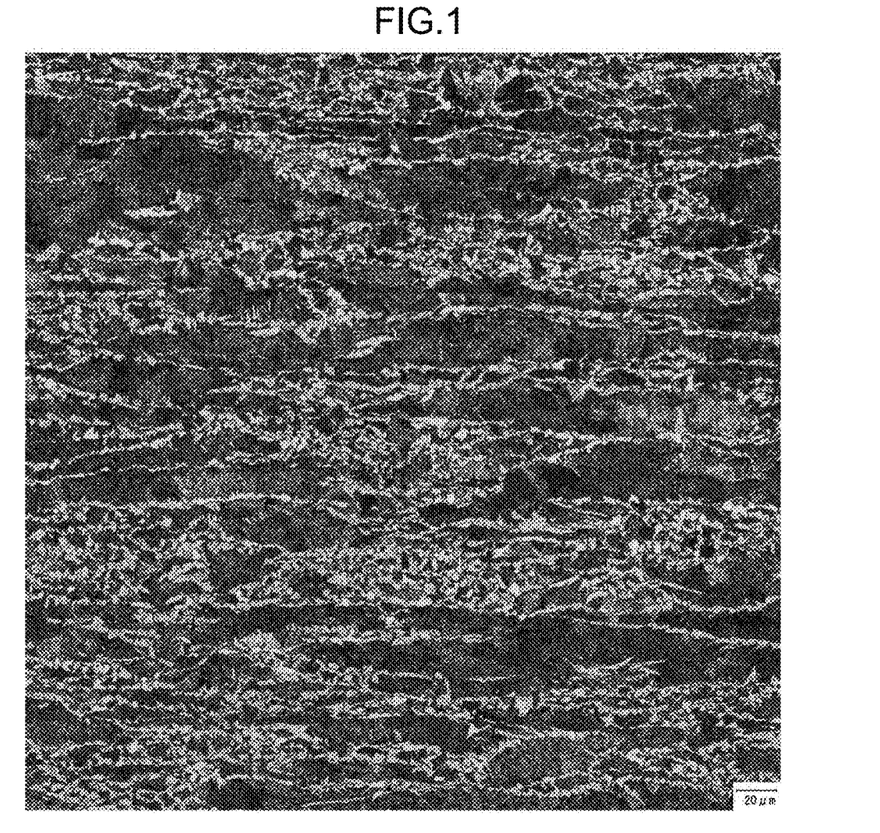
FIG. 1 is a metallographic micrograph (optical micrograph, at a magnification of 500 times) showing a metallographic structure at a position of ¼ of a pipe thickness in an L cross-section at the base metal 90° position of an electric resistance welded oil well pipe according to an example of an electric resistance welded oil well pipe of the present disclosure.

FIG. 1 is a metallographic micrograph (optical micrograph, at a magnification of 500 times) showing a metallographic structure at a position of ¼ of a pipe thickness in an L cross-section at the base metal 90° position of an electric resistance welded oil well pipe according to an example of an electric resistance welded oil well pipe of the present disclosure.

In the metallographic structure shown in FIG. 1, white parts represent ferrite, and black parts represent pearlite.

Figure 2:
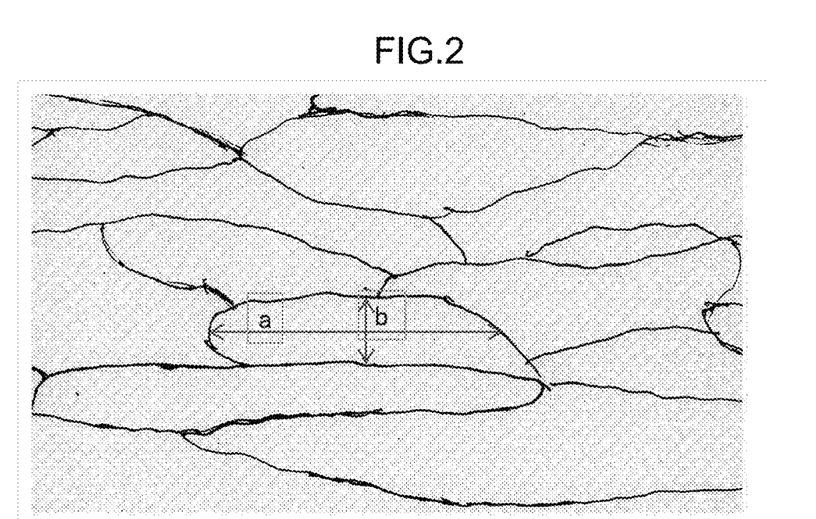
FIG. 2 is a schematic view showing the grain boundary of prior austenite grains (i.e., grain boundary ferrite) in a part of FIG. 1.

FIG. 2 is a schematic view showing, with lines, the grain boundary of prior austenite grains (i.e., grain boundary ferrite) in a part of FIG. 1. In FIG. 2, "a" represents the major axis diameter of the inscribed ellipse of a specific prior austenite grain, and "b" represents the minor axis diameter of the inscribed ellipse of the specific prior austenite grain.

As shown in FIG. 1 and FIG. 2, a ferrite-pearlite structure in which prior austenite grains are flattened is found to be formed. In addition, ferrite (i.e., intragranular ferrite) is found to be present within the prior austenite grains.

The mechanical characteristics of the electric resistance welded oil well pipe of the present disclosure and preferred embodiments thereof will now be described.

Because the electric resistance welded oil well pipe of the present disclosure is a K55 steel pipe, the TS of the electric resistance welded oil well pipe of the present disclosure in an L direction is 655 N/mm$^2$ or more.

The upper limit of the TS of the electric resistance welded oil well pipe in the L direction is not particularly restricted. The TS of the electric resistance welded oil well pipe in the L direction is preferably 750 N/mm$^2$ or less in view of allowing a YS of 552 N/mm$^2$ or less to be more easily achieved.

Because the electric resistance welded oil well pipe of the present disclosure is a K55 steel pipe, the YS of the electric resistance welded oil well pipe of the present disclosure in the L direction is from 379 to 552 N/mm$^2$.

The YS in the L direction is preferably from 379 to 530 N/mm$^2$. A YS of from 379 to 530 N/mm$^2$ in the L direction is advantageous for improvement in base metal toughness.

The electric resistance welded oil well pipe of the present disclosure has excellent base metal toughness as described above.

The electric resistance welded oil well pipe of the present disclosure preferably has a Charpy impact absorbed energy of 40 J or more, preferably 42 J or more, at 0° C.

The upper limit of the Charpy impact absorbed energy (0° C.) is not particularly restricted. The Charpy impact absorbed energy (0° C.) may be 70 J or less from the viewpoint of allowing a TS of 655 N/mm$^2$ or more to be more easily satisfied.

Herein, the Charpy impact absorbed energy (0° C.) means a value determined as described below.

In a case in which the pipe thickness of the electric resistance welded oil well pipe is 10 mm or more, a full size specimen with a V-notch (specimen for Charpy impact test) is sampled from the electric resistance welded oil well pipe, and the Charpy absorbed energy (J) of the sampled full size specimen with a V-notch is measured. The measurement is performed five times for each electric resistance welded oil well pipe, and the average value of the five measurement values is regarded as the Charpy absorbed energy (J) of the electric resistance welded oil well pipe.

In a case in which the pipe thickness of the electric resistance welded oil well pipe is less than 10 mm, a subsize specimen with a V-notch is sampled from the electric resistance welded oil well pipe, the Charpy absorbed energy (J) of the sampled subsize specimen with a V-notch is measured, and the obtained measurement value is converted into Charpy absorbed energy (J) at a pipe thickness of 10 mm. The measurement and the conversion are performed five times for each electric resistance welded oil well pipe, and the average value of the five conversion values is regarded as the Charpy absorbed energy (J) of the electric resistance welded oil well pipe.

The outer diameter of the electric resistance welded oil well pipe of the present disclosure is preferably from 139.7 to 660.4 mm, and more preferably from 193.7 to 609.6 mm.

The pipe thickness of the electric resistance welded oil well pipe of the present disclosure is preferably from 5.0 to 21 mm, and more preferably from 6.0 to 18 mm.

[Hot-Rolled Steel Sheet]

A hot-rolled steel sheet preferred for producing the electric resistance welded oil well pipe of the present disclosure (i.e., preferred as the material of the electric resistance welded oil well pipe of the present disclosure) (hereinafter also referred to as "hot-rolled steel sheet of the present disclosure") will now be described.

In the hot-rolled steel sheet of the present disclosure, the chemical composition is the above-described chemical composition in the present disclosure, the metallographic structure at a position of ¼ a sheet thickness in an L cross-section (i.e., a position to which the distance from a sheet surface is ¼ the sheet thickness) is a ferrite-pearlite structure in which flattened prior γ-grains, includes grain boundary ferrite and intragranular ferrite, and has a total area rate T (i.e., a rate of a total area of the grain boundary ferrite and the intragranular ferrite with respect to a total area of the metallographic structure) of from 10 to 30%, TS in an L direction (i.e., tensile strength in sheet longitudinal direction) is 640 N/mm² or more, and YS in the L direction (i.e., yield strength in sheet longitudinal direction) is from 294 to 467 N/mm².

The chemical composition and preferred embodiments in the hot-rolled steel sheet of the present disclosure are similar to the chemical composition and preferred embodiments in the electric resistance welded oil well pipe of the present disclosure.

The metallographic structure and preferred embodiments at the position of ¼ the sheet thickness in the hot-rolled steel sheet of the present disclosure are similar to the metallographic structure and preferred embodiments at the position of ¼ the pipe thickness at the base metal 90° position in the electric resistance welded oil well pipe of the present disclosure.

The reason thereof is that a chemical composition as well as a metallographic structure which can be observed with an optical microscope hardly differs between before and after cold forming described below.

In a case in which the electric resistance welded oil well pipe of the present disclosure is produced using the hot-rolled steel sheet of the present disclosure, both TS and YS are increased by performing the cold forming of the hot-rolled steel sheet of the present disclosure in a pipe shape. In particular, YS is greatly increased.

Thus, in consideration of such an increase, the lower limit of TS, the lower limit of YS, and the upper limit of YS in the hot-rolled steel sheet of the present disclosure are lower than the lower limit of TS, the lower limit of YS, and the upper limit of YS in the electric resistance welded oil well pipe of the present disclosure, respectively.

The form of the hot-rolled steel sheet of the present disclosure is preferably the form of a hot coil having a coil form.

The sheet thickness of the hot-rolled steel sheet of the present disclosure is preferably from 5.0 to 21 mm, and more preferably from 6.0 to 18 mm.

A preferred method of producing the hot-rolled steel sheet of the present disclosure will now be described.

The preferred method of producing the hot-rolled steel sheet of the present disclosure includes:

a step of heating a slab having the chemical composition in the present disclosure to a heating temperature of 1150° C. or more (hereinafter also referred to as "heating step");

a step of hot-rolling the heated slab under conditions of a cumulative reduction rate of 35% or more in a temperature range of 830° C. or less and a hot-rolling finishing temperature of 750° C. or less, to obtain a steel sheet (hereinafter also referred to as "hot-rolling step");

a step of cooling the obtained steel sheet (hereinafter also referred to as "cooling step"); and a step of coiling the cooled steel sheet (hereinafter also referred to as "coiling step").

According to the preferred method of producing, the hot-rolled steel sheet in the form of a hot coil is produced.

The sheet thickness of the slab heated in the heating step is preferably from 200 to 300 mm.

The heating temperature in the heating step is 1150° C. or more as described above.

A heating temperature of 1150° C. or more allows a metallographic structure including intragranular ferrite to be easily obtained. The excessively low heating temperature results in a smaller austenite grain size, causes grain boundary ferrite to be more preferentially precipitated than intragranular ferrite, and may thus make it impossible to obtain a metallographic structure including intragranular ferrite.

The heating temperature in the heating step is preferably more than 1180° C.

The heating temperature in the heating step is preferably 1250° C. or less from the viewpoint of production suitability.

In the hot-rolling step, the slab heated to the heating temperature is hot-rolled under the conditions of a cumulative reduction rate of 35% or more in a temperature range of 830° C. or less and a hot-rolling finishing temperature of 750° C. or less, to obtain the steel sheet.

The hot rolling under such conditions enables a cumulative reduction rate in an austenite unrecrystallization temperature range to be increased (for example, to 43% or more), and therefore facilitates formation of a metallographic structure which is a ferrite-pearlite structure in which prior γ-grains are flattened, includes grain boundary ferrite and intragranular ferrite, and has a total area rate T of from 10 to 30%.

It is preferable that the hot-rolling step includes rough rolling and finish rolling in the order mentioned above, and the finish rolling is performed under conditions of a cumulative reduction rate of 35% or more in a temperature range of 830° C. or less and a hot-rolling finishing temperature (i.e., finish rolling finishing temperature) of 750° C. or less.

As a result, the metallographic structure described above is more easily formed.

The rough rolling may be performed under known conditions, and is not particularly restricted.

A cumulative reduction rate in the rough rolling is, for example, from 50 to 90%, and preferably from 70 to 90%.

An example of the hot-rolling step will be described with reference to FIG. 3A and FIG. 3B.

Figure 3A:
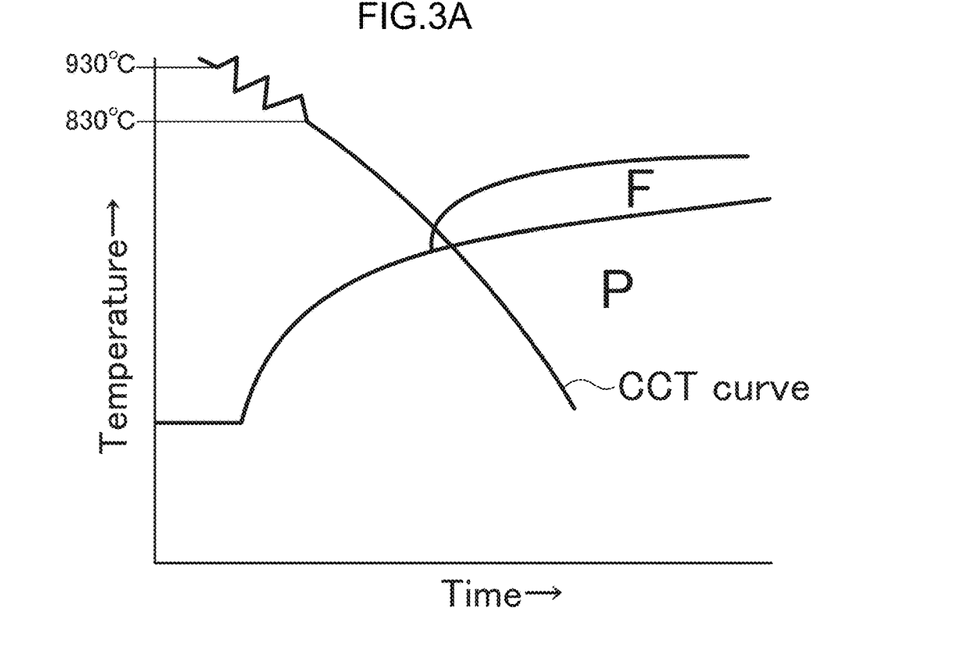
FIG. 3A is a view schematically showing an example of a CCT curve in the case of hot-rolling a steel with a high C content at a typical hot-rolling temperature and cooling the steel on an ROT.

FIG. 3A is a view schematically showing an example of a CCT curve (continuous cooling transformation diagram) in the case of rolling a steel with a high C content (for example, the steel having the chemical composition in the present disclosure) at a typical hot-rolling temperature (specifically, a finish rolling start temperature of 930° C. and a finish rolling finishing temperature of 830° C.) and cooling the steel on an ROT.

Figure 3B:
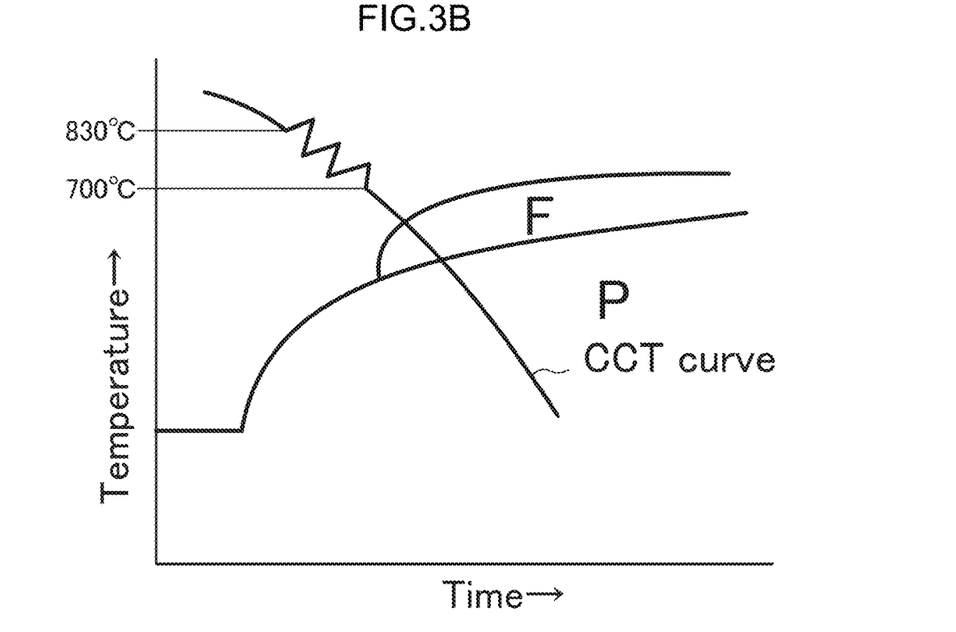
FIG. 3B is a view schematically showing an example of a CCT curve in the case of hot-rolling a steel with a high C content at a temperature that is lower than a typical hot-rolling temperature and cooling the steel on an ROT.

FIG. 3B is a view schematically showing an example of a CCT curve in the case of rolling a steel with a high C content (for example, the steel having the chemical composition in the present disclosure) at a hot-rolling temperature (specifically, a finish rolling start temperature of 830° C. and a finish rolling finishing temperature of 700° C.) that is lower than a typical hot-rolling temperature and cooling the steel on an ROT.

In FIG. 3A and FIG. 3B, F represents a ferrite region, and P represents a pearlite region.

In FIG. 3A and FIG. 3B, a jagged part in a CCT curve means finish rolling. In FIG. 3A and FIG. 3B, illustration of the rough rolling is omitted.

As shown in FIG. 3A, the CCT curve merely slightly crosses the nose of the ferrite region (F in the figure) in a case in which the steel with a high C content is hot-rolled at a typical hot-rolling temperature (specifically, a finish rolling start temperature of 930° C. and a finish rolling finishing temperature of 830° C.) and cooled on the ROT.

Therefore, a metallographic structure after transformation becomes a pearlite structure in which a small amount of ferrite is precipitated in the grain boundary of prior γ-grains (a small amount of grain boundary ferrite+pearlite structure).

In this structure, a small amount of soft ferrite is merely present in the grain boundary, no intragranular ferrite is present, and therefore, it is impossible to maintain YS at a low level.

As shown in FIG. 3B, the nose of the ferrite region (F in the figure) protrudes toward a shorter time side in a case in which the steel with a high C content is rolled at a hot-rolling temperature (specifically, a finish rolling start temperature of 830° C. and a finish rolling finishing temperature of 700° C.) that is lower than a typical hot-rolling temperature. Therefore, the CCT curve crosses the ferrite region in the case of cooling the steel on the ROT after the finish rolling finishing temperature.

As a result, in a metallographic structure after transformation, a pearlite structure in which ferrite is precipitated not only in a grain boundary but also within a grain (specifically, ferrite-pearlite structure including grain boundary ferrite and intragranular ferrite and having a total area rate T of from 10 to 30%) is formed.

In this structure, soft ferrite is present in a grain boundary and within a grain, and therefore, YS can be maintained at a low level, specifically in the range of YS in the hot-rolled steel sheet of the present disclosure.

The cooling step is a step of cooling the steel sheet obtained by the hot rolling.

The cooling is preferably performed on the ROT.

A cooling rate in the cooling is preferably high from the viewpoint of the productivity (i.e., reduction in production cost) of the hot-rolled steel sheet and the electric resistance welded oil well pipe.

An average cooling rate in the cooling is, for example, from 3 to 20° C./s, and preferably from 5 to 15° C./s.

A time between the end of the rolling and the start of the cooling is preferably 30 seconds or less, and more preferably 10 seconds or less.

The cooling is performed until the temperature of the steel sheet reaches a desired coiling temperature.

The coiling temperature is, for example, from 500 to 700° C., and preferably 550 to 700° C.

The coiling step is a step of coiling the cooled steel sheet.

The preferred range of a coiling temperature at which the steel sheet is coiled is described above.

The hot-rolled steel sheet in the form of a hot coil is obtained by the coiling step.

A preferred method of producing the electric resistance welded oil well pipe of the present disclosure will now be described.

The preferred method of producing the electric resistance welded oil well pipe of the present disclosure includes:

a step of producing a hot-rolled steel sheet in the form of a hot coil by the preferred method of producing the hot-rolled steel sheet of the present disclosure described above (hereinafter also referred to as "hot-rolled steel sheet production step"); and a step of uncoiling the hot-rolled steel sheet in the form of a hot coil, cold forming the uncoiled hot-rolled steel sheet in a pipe shape to obtain an open pipe, and subjecting the butting portion of the obtained open pipe to electric resistance welding to obtain an electric resistance welded oil well pipe (hereinafter also referred to as "electric resistance welded oil well pipe production step").

In the electric resistance welded oil well pipe production step, an electric resistance welded zone may be subjected to seam heat treatment after the electric resistance welding. The toughness of the electric resistance welded zone is improved by the seam heat treatment.

A preferred embodiment of the hot-rolled steel sheet production step is described above.

Typical conditions can be applied to each of the cold forming and the electric resistance welding in the electric resistance welded oil well pipe production step.

EXAMPLES

Examples of one embodiment of the present disclosure will be described, provided that the present invention is not limited to the following Examples.

Examples 1 to 10, and Comparative Examples 1 to 17

<Production of Hot-Rolled Steel Sheet>

Each slab having a sheet thickness of 250 mm obtained by continuous casting of molten steels having the chemical compositions of steels a to 1 in Table 1 was heated to a heating temperature shown in Table 2, the heated slab having a sheet thickness of 250 mm was subjected to rough rolling to obtain a steel sheet until having a sheet thickness of 40 mm, and the obtained steel sheet was subjected to finish rolling under conditions of a finish rolling start temperature of 900° C., a cumulative reduction rate in a temperature range of 830° C. or less shown in Table 2, and a finish rolling outlet side temperature (i.e., finish rolling finishing temperature) shown in Table 2. The steel sheet subjected to the finish rolling was cooled to a coiling temperature of from 580° C. to 630° C. at an average cooling rate of from 5 to 15° C./s immediately after the end of the finish rolling (specifically, within ten seconds after the end of the finish rolling), and was coiled. As a result, a hot-rolled steel sheet (hot coil) having a sheet thickness of 15.9 mm, coiled in a coil form, was obtained.

In Table 1, Mneq shows a Mn equivalent.

<Production of Electric Resistance Welded Oil Well Pipe>

The above-described hot-rolled steel sheet coiled in a coil form (hot coil) was uncoiled, the uncoiled hot-rolled steel sheet was cold-formed in a pipe shape to obtain an open pipe, and the butting portion of the obtained open pipe was subjected to electric resistance welding under typical conditions, thereby obtaining an electric resistance welded steel pipe having an outer diameter of 508 mm and a pipe thickness of 15.9 mm. The electric resistance welded zone of the obtained electric resistance welded steel pipe was heated to from 970° C. to 1050° C., thereby being subjected to heat treatment (seam heat treatment) in which the pipe inner surface had an Ac3 point or more, to obtain an electric resistance welded oil well pipe.

<Observation of Metallographic Structure>

A specimen for observing an L cross-section of the electric resistance welded oil well pipe (base metal) was sampled from the base metal 90° position of the obtained electric resistance welded oil well pipe.

The L cross-section in the sampled specimen was polished, and then etched with a nital reagent. Then, metallographic micrographs of a position of ¼ of a pipe thickness in the etched L cross-section (i.e., a position to which the distance from the pipe outer surface of the electric resistance welded oil well pipe was ¼ the pipe thickness) were taken at a magnification of 500 times with an optical microscope corresponding to 10 visual fields (corresponding to an actual area of the L cross-section of 1.6 mm²).

The taken metallographic micrographs (corresponding to an actual area of the L cross-section of 1.6 mm²) were subjected to image processing by using a small-sized general-purpose image analyzer LUZEX AP manufactured by NIRECO CORPORATION.

Based on the metallographic micrographs subjected to the image processing, the metallographic structure was classified, and further, a ferrite area fraction (i.e., a rate of a total area of the grain boundary ferrite and the intragranular ferrite with respect to a total area of the metallographic structure) was measured.

In addition, based on the metallographic micrographs subjected to the image processing, the presence or absence of intragranular ferrite (i.e., whether or not the metallographic structure included intragranular ferrite) was confirmed. Here, a case in which the area rate of the intragranular ferrite with respect to the total area of the grain boundary ferrite and the intragranular ferrite was 10% or more (i.e., a case in which the intragranular ferrite is substantially present) was regarded as intragranular ferrite being "present", while a case in which the area rate of the intragranular ferrite with respect to the total area of the grain boundary ferrite and the intragranular ferrite was less than 10% (i.e., a case in which the intragranular ferrite is not substantially present) was regarded as intragranular ferrite being "absent".

In addition, based on the metallographic micrographs subjected to the image processing, the aspect ratio of prior γ-grains was determined by the above-described method.

The above results are shown in Table 3.

In Table 3, F-P means a ferrite-pearlite structure.

In addition, all the metallographic structures of Examples 1 to 10 and Comparative Examples 1 to 17 included grain boundary ferrite, as not clearly shown in Table 3.

In Example 1, the metallographic structure of the hot-rolled steel sheet used as the material of the electric resistance welded oil well pipe was also observed.

Specifically, the metallographic structure of the hot-rolled steel sheet was observed in a manner similar to the observation of the metallographic structure of the electric resistance welded oil well pipe, except that a specimen for observing an L cross-section of the hot-rolled steel sheet sampled from a position to which the distance from one end of the hot-rolled steel sheet in a sheet width direction is ¼ a sheet width was used as a specimen.

The results are shown in Table 3.

In Table 3, "sheet" means a hot-rolled steel sheet, and "pipe" means an electric resistance welded oil well pipe.

<Measurement of TS and YS>

A tensile test specimen No. 12 in JIS was sampled as a full thickness specimen from the electric resistance welded oil well pipe described above. The full thickness specimen was sampled from the base metal 90° position of the electric resistance welded oil well pipe in such a direction that a tensile direction in a tensile test was a pipe longitudinal direction (L direction). The sampled full thickness specimen was subjected to a tensile test in which a tensile direction was the L direction, according to JIS Z2241 (2011), and each of TS in the L direction and YS in the L direction (i.e., 0.5% under load proof stress in L direction) was measured.

The results are shown in Table 3.

In Example 1, the TS and YS of the hot-rolled steel sheet used as the material of the electric resistance welded oil well pipe were also measured.

Specifically, the TS and YS of the hot-rolled steel sheet were measured in a manner similar to the measurement of the TS and YS of the electric resistance welded oil well pipe except that the full thickness specimen (tensile test specimen No. 12 in JIS) of the hot-rolled steel sheet sampled from a position to which the distance from one end of the hot-rolled steel sheet in a sheet width direction is ¼ a sheet width was used as a tension specimen.

The results are shown in Table 3.

<Measurement of Charpy Impact Absorbed Energy>

A full size specimen with a V-notch (specimen for Charpy impact test) was sampled from the electric resistance welded oil well pipe. The full size specimen with a V-notch was sampled so that the longitudinal direction of the specimen was the L direction. The sampled full size specimen with a V-notch was subjected to a Charpy impact test according to JIS Z2242 (2005) under a temperature conditions of 0° C., thereby measuring Charpy absorbed energy (J).

The above measurement was performed five times for each electric resistance welded oil well pipe, and the average value of the five measurement values was regarded as the Charpy absorbed energy (J) of the electric resistance welded oil well pipe.

TABLE 1

| Steel | C | Si | Mn | P | S | Al | N | Cu | Ni | Cr | Mo | V | Nb | Ti | Ca | Mneq | |
|---|---|---|---|---|---|---|---|---|---|---|---|---|---|---|---|---|---|
| a | 0.41 | 0.26 | 0.96 | 0.015 | 0.004 | 0.016 | 0.0035 | | | | | | | | | 0.96 | Example |
| b | 0.44 | 0.24 | 0.91 | 0.016 | 0.005 | 0.016 | 0.0042 | | | | | | | | 0.0011 | 0.91 | Example |
| c | 0.37 | 0.32 | 1.18 | 0.015 | 0.005 | 0.014 | 0.0052 | | | | | | | | | 1.18 | Example |
| d | 0.47 | 0.26 | 0.87 | 0.014 | 0.004 | 0.023 | 0.0038 | | | | | | | | | 0.87 | Example |
| e | 0.40 | 0.25 | 0.71 | 0.015 | 0.004 | 0.018 | 0.0043 | 0.27 | 0.28 | | | | | | | 0.93 | Example |
| f | 0.41 | 0.24 | 0.80 | 0.016 | 0.004 | 0.026 | 0.0041 | | | 0.12 | | | | | | 0.94 | Example |
| g | 0.40 | 0.24 | 0.88 | 0.015 | 0.004 | 0.028 | 0.0030 | | | | 0.05 | | | | | 0.94 | Example |
| h | 0.42 | 0.27 | 1.14 | 0.015 | 0.005 | 0.028 | 0.0039 | | | | | 0.04 | | | | 1.19 | Example |
| i | 0.41 | 0.18 | 0.92 | 0.012 | 0.003 | 0.019 | 0.0059 | | | | | | 0.008 | | 0.0015 | 0.92 | Example |
| j | 0.40 | 0.38 | 0.93 | 0.008 | 0.003 | 0.011 | 0.0072 | | | | | | | 0.007 | | 0.93 | Example |
| k | 0.28 | 0.25 | 1.20 | 0.016 | 0.004 | 0.015 | 0.0041 | | | | | | | | | 1.20 | Comparative Example |
| l | 0.42 | 0.25 | 1.24 | 0.014 | 0.004 | 0.013 | 0.0035 | | | | | | | | | 1.24 | Comparative Example |

TABLE 2

| | Steel | Heating temperature (° C.) | Cumulative reduction rate (%) in temperature range of 830° C. or less | Finish rolling outlet side temperature (° C.) |
|---|---|---|---|---|
| Example 1 | a | 1185 | 40 | 738 |
| Example 2 | b | 1185 | 40 | 732 |
| Example 3 | c | 1185 | 40 | 737 |
| Example 4 | d | 1185 | 40 | 735 |
| Example 5 | e | 1185 | 40 | 737 |
| Example 6 | f | 1185 | 40 | 734 |
| Example 7 | g | 1185 | 40 | 734 |
| Example 8 | h | 1185 | 40 | 720 |
| Example 9 | i | 1185 | 40 | 739 |
| Example 10 | j | 1185 | 40 | 729 |
| Comparative Example 1 | k | 1185 | 40 | 739 |
| Comparative Example 2 | l | 1185 | 40 | 727 |
| Comparative Example 3 | a | 1130 | 25 | 728 |
| Comparative Example 4 | b | 1130 | 25 | 729 |
| Comparative Example 5 | c | 1130 | 25 | 720 |
| Comparative Example 6 | d | 1130 | 25 | 757 |
| Comparative Example 7 | e | 1130 | 25 | 744 |
| Comparative Example 8 | f | 1130 | 25 | 736 |
| Comparative Example 9 | g | 1130 | 25 | 741 |
| Comparative Example 10 | h | 1130 | 25 | 731 |
| Comparative Example 11 | i | 1130 | 25 | 745 |
| Comparative Example 12 | j | 1130 | 25 | 739 |
| Comparative Example 13 | k | 1130 | 25 | 736 |
| Comparative Example 14 | l | 1130 | 25 | 737 |
| Comparative Example 15 | a | 1185 | 40 | 790 |
| Comparative Example 16 | a | 1130 | 40 | 736 |
| Comparative Example 17 | a | 1185 | 25 | 742 |

TABLE 3

| | Steel | Sheet/pipe | Classification of metallographic structure | Ferrite area fraction (%) | Intragranular ferrite | Aspect ratio of prior γ-grains | TS in L direction (N/mm$^2$) | YS in L direction (N/mm$^2$) | Charpy absorbed energy (J) |
|---|---|---|---|---|---|---|---|---|---|
| Example 1 | a | Sheet | F-P | 17 | Present | 4.6 | 712 | 427 | 65 |
| | | Pipe | F-P | 17 | Present | 4.6 | 727 | 512 | 52 |
| Example 2 | b | Pipe | F-P | 19 | Present | 4.2 | 715 | 503 | 48 |
| Example 3 | c | Pipe | F-P | 22 | Present | 4.7 | 721 | 508 | 58 |
| Example 4 | d | Pipe | F-P | 14 | Present | 4.6 | 735 | 518 | 42 |
| Example 5 | e | Pipe | F-P | 23 | Present | 4.8 | 702 | 491 | 55 |
| Example 6 | f | Pipe | F-P | 21 | Present | 4.5 | 700 | 490 | 50 |
| Example 7 | g | Pipe | F-P | 19 | Present | 4.4 | 708 | 497 | 51 |
| Example 8 | h | Pipe | F-P | 12 | Present | 4.5 | 724 | 521 | 48 |
| Example 9 | i | Pipe | F-P | 13 | Present | 4.9 | 715 | 521 | 58 |
| Example 10 | j | Pipe | F-P | 15 | Present | 4.7 | 714 | 507 | 55 |
| Comparative Example 1 | k | Pipe | F-P | 32 | Present | 2.8 | 623 | 437 | 71 |
| Comparative Example 2 | l | Pipe | F-P | 8 | Present | 4.1 | 787 | 556 | 41 |
| Comparative Example 3 | a | Pipe | F-P | 12 | Absent | 2.5 | 718 | 567 | 27 |
| Comparative Example 4 | b | Pipe | F-P | 14 | Absent | 2.5 | 708 | 559 | 21 |
| Comparative Example 5 | c | Pipe | F-P | 17 | Absent | 2.4 | 703 | 557 | 28 |
| Comparative Example 6 | d | Pipe | F-P | 11 | Absent | 2.5 | 724 | 569 | 18 |
| Comparative Example 7 | e | Pipe | F-P | 18 | Absent | 2.6 | 698 | 554 | 25 |
| Comparative Example 8 | f | Pipe | F-P | 15 | Absent | 2.4 | 706 | 557 | 24 |
| Comparative Example 9 | g | Pipe | F-P | 15 | Absent | 2.7 | 702 | 556 | 27 |
| Comparative Example 10 | h | Pipe | F-P | 9 | Absent | 2.4 | 731 | 578 | 23 |
| Comparative Example 11 | i | Pipe | F-P | 9 | Absent | 2.9 | 721 | 577 | 33 |
| Comparative Example 12 | j | Pipe | F-P | 11 | Absent | 2.6 | 719 | 568 | 29 |
| Comparative Example 13 | k | Pipe | F-P | 26 | Absent | 2.4 | 613 | 483 | 49 |
| Comparative Example 14 | l | Pipe | F-P | 7 | Absent | 2.3 | 754 | 593 | 19 |
| Comparative Example 15 | a | Pipe | F-P | 8 | Absent | 3.1 | 735 | 562 | 28 |

TABLE 3-continued

| | Steel | Sheet/pipe | Classification of metallographic structure | Ferrite area fraction (%) | Intragranular ferrite | Aspect ratio of prior γ-grains | TS in L direction (N/mm$^2$) | YS in L direction (N/mm$^2$) | Charpy absorbed energy (J) |
|---|---|---|---|---|---|---|---|---|---|
| Comparative Example 16 | a | Pipe | F-P | 12 | Absent | 4.2 | 725 | 565 | 35 |
| Comparative Example 17 | a | Pipe | F-P | 13 | Absent | 2.5 | 728 | 570 | 21 |

As shown in Table 3, each of the electric resistance welded oil well pipes of Examples 1 to 10, having a chemical composition within the scope of the present disclosure (steels a to j), having a metallographic structure which is a ferrite-pearlite structure (F-P) in which prior γ-grains are flattened (specifically, an aspect ratio of prior γ-grains of 3.0 or more), having a ferrite area fraction (i.e., a rate of a total area of the grain boundary ferrite and the intragranular ferrite with respect to a total area of the metallographic structure) of from 10 to 30%, and including intragranular ferrite, had a TS in an L direction of 655 N/mm$^2$ or more and a YS in an L direction of from 379 to 552 N/mm$^2$, and therefore corresponded to an as-rolled type K55 electric resistance welded oil well pipe.

The electric resistance welded oil well pipes of Examples 1 to 10 had high Charpy impact energy and excellent base metal toughness.

In contrast, TS was less than 655 N/mm$^2$ in each of Comparative Examples 1 and 13 in which the C contents were less than 0.30%.

The ferrite area fraction was less than 10%, and YS was more than 552 N/mm$^2$ in each of Comparative Examples 2 and 14 in which the Mn contents were more than 1.20%. Comparative Examples 2 and 14 were inferior in base metal toughness (Charpy impact energy) to Examples 1 to 10.

YS was more than 552 N/mm$^2$ in each of Comparative Examples 3 to 12 and 15 to 17 in which the chemical compositions were within the scope of the present disclosure (steels a to j), but no intragranular ferrite was included. Comparative Examples 3 to 12 and 15 to 17 were inferior in base metal toughness (Charpy impact energy) to Examples 1 to 10.

The entire disclosure of Japanese Patent Application No. 2015-248283 is incorporated herein by reference.

All documents, patent applications, and technical standards described in this specification are herein incorporated by reference to the same extent as if each individual document, patent application, or technical standard was specifically and individually indicated to be incorporated by reference.

The invention claimed is:

1. An as-rolled K55 electric resistance welded oil well pipe having a chemical composition consisting of, in terms of % by mass:
from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance being Fe and impurities,
wherein a Mn equivalent defined in the following Equation (1) is from 0.50 to 1.20:

$$\text{Mn equivalent} = ([\text{Mn}]/6 + [\text{Cu}]/15 + [\text{Ni}]/15 + [\text{Cr}]/5 + [\text{Mo}]/5 + [\text{V}]/5) \times 6 \quad (1)$$

wherein, in Equation (1), [Mn], [Cu], [Ni], [Cr], [Mo], and [V] represent % by mass of Mn, Cu, Ni, Cr, Mo, and V, respectively,
wherein a metallographic structure, at a position to which a distance from a pipe outer surface is ¼ of a pipe thickness in an L cross-section at a position deviating at 90° in a circumferential direction from an electric resistance welded zone, is a ferrite-pearlite structure in which prior austenite grains are flattened, comprises grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%,
wherein, in the metallographic structure, an area rate of the intragranular ferrite with respect to a total area of the intragranular ferrite and the grain boundary ferrite is 10% or more, and
wherein, in the metallographic structure, the prior austenite grains have an aspect ratio of 3.0 or more.

2. The as-rolled K55 electric resistance welded oil well pipe according to claim 1, wherein a tensile strength in an L direction is 655 N/mm$^2$ or more, and a yield strength in the L direction is from 379 to 530 N/mm$^2$.

3. The as-rolled K55 electric resistance welded oil well pipe according to claim 2,
wherein, in the chemical composition, in terms of % by mass, one or more of:
from more than 0 to 0.30% of Cu,
from more than 0 to 0.30% of Ni,
from more than 0 to 0.30% of Cr,
from more than 0 to 0.10% of Mo,
from more than 0 to 0.10% of V,
from more than 0 to 0.050% of Nb,
from more than 0 to 0.030% of Ti, or
from more than 0 to 0.0100% of Ca
are present, and
wherein, in the chemical composition, the Mn equivalent is from 0.70 to 1.20.

4. A hot-rolled steel sheet used for producing the as-rolled K55 electric resistance welded oil well pipe according to claim 2, the hot-rolled steel sheet having a chemical composition consisting of, in terms of % by mass:

from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance being Fe and impurities,
wherein the Mn equivalent is from 0.50 to 1.20,
wherein a metallographic structure, at a position to which a distance from a sheet surface is ¼ of a sheet thickness in an L cross-section is a ferrite-pearlite structure in which prior austenite grains are flattened, includes grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%,
wherein, in the metallographic structure, an area rate of the intragranular ferrite with respect to a total area of the intragranular ferrite and the grain boundary ferrite is 100 or more,
wherein, in the metallographic structure, the prior austenite grains have an aspect ratio of 3.0 or more, and
wherein a tensile strength in an L direction is 640 N/mm² or more, and a yield strength in an L direction is from 294 to 467 N/mm².

5. The as-rolled K55 electric resistance welded oil well pipe according to claim 1,
wherein, in the chemical composition, in terms of % by mass, one or more of:
from more than 0 to 0.30% of Cu,
from more than 0 to 0.30% of Ni,
from more than 0 to 0.30% of Cr,
from more than 0 to 0.10% of Mo,
from more than 0 to 0.10% of V,
from more than 0 to 0.050% of Nb,
from more than 0 to 0.030% of Ti, or
from more than 0 to 0.0100% of Ca
are present, and
wherein, in the chemical composition, the Mn equivalent is from 0.70 to 1.20.

6. A hot-rolled steel sheet used for producing the as-rolled K55 electric resistance welded oil well pipe according to claim 1, the hot-rolled steel sheet having a chemical composition consisting of, in terms of % by mass:
from 0.30 to 0.50%, of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance being Fe and impurities,
wherein the Mn equivalent is from 0.50 to 1.20,
wherein a metallographic structure, at a position to which a distance from a sheet surface is ¼ of a sheet thickness in an L cross-section is a ferrite-pearlite structure in which prior austenite grains are flattened, includes grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%,
wherein, in the metallographic structure, an area rate of the intragranular ferrite with respect to a total area of the intragranular ferrite and the grain boundary ferrite is 10% or more,
wherein, in the metallographic structure, the prior austenite grains have an aspect ratio of 3.0 or more, and
wherein a tensile strength in an L direction is 640 N/mm² or more, and a yield strength in an L direction is from 294 to 467 N/mm².

7. An as-rolled K55 electric resistance welded oil well pipe having a chemical composition comprising, in terms of % by mass:
from 0.30 to 0.50% of C,
from 0.05 to 0.40% of Si,
from 0.50 to 1.20% of Mn,
from 0 to 0.030% of P,
from 0 to 0.0200% o of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.0500% of Nb,
from 0 to 0.030% of Ti,
from 0 to 0.0100% of Ca, and
the balance comprises Fe and impurities,
wherein a Mn equivalent defined in the following Equation (1) is from 0.50 to 1.20:

$$\text{Mn equivalent} = ([Mn]/6 + [Cu]/15 + [Ni]/15 + [Cr]/5 + [Mo]/5 + [V]/5) \times 6 \quad (1)$$

wherein, in Equation (1), [Mn], [Cu], [Ni], [Cr], [Mo], and [V] represent % by mass of Mn, Cu, Ni, Cr, Mo, and V, respectively, and
wherein a metallographic structure, at a position to which a distance from a pipe outer surface is ¼ of a pipe thickness in an L cross-section at a position deviating at 90° in a circumferential direction from an electric resistance welded zone, is a ferrite-pearlite structure in which prior austenite grains are flattened, comprises grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%, wherein, in the metallographic structure, an area rate of the intragranular ferrite with respect to a total area of the intragranular ferrite and the grain boundary ferrite is 10% or more, and wherein, in the metallographic structure, the prior austenite grains have an aspect ratio of 3.0 or more.

8. The as-rolled K55 electric resistance welded oil well pipe according to claim 7, wherein a tensile strength in an L direction is 655 N/mm² or more, and a yield strength in the L direction is from 379 to 530 N/mm².

9. The as-rolled K55 electric resistance welded oil well pipe according to claim 8,
wherein the chemical composition comprises, in terms of % by mass, one or more of:
from more than 0 to 0.30% of Cu,
from more than 0 to 0.30% of Ni,
from more than 0 to 0.30% of Cr,
from more than 0 to 0.10% of Mo,
from more than 0 to 0.10% of V,
from more than 0 to 0.050% of Nb,
from more than 0 to 0.030% of Ti, or
from more than 0 to 0.0100% of Ca, and
wherein, in the chemical composition, the Mn equivalent is from 0.70 to 1.20.

10. A hot-rolled steel sheet used for producing the as-rolled K55 electric resistance welded oil well pipe according to claim 8, the hot-rolled steel sheet having a chemical composition comprising, in terms of % by mass:
from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance comprises Fe and impurities,
wherein the Mn equivalent is from 0.50 to 1.20,
wherein a metallographic structure, at a position to which a distance from a sheet surface is ¼ of a sheet thickness in an L cross-section is a ferrite-pearlite structure in which prior austenite grains are flattened, includes grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%,
wherein, in the metallographic structure, an area rate of the intragranular ferrite with respect to a total area of the intragranular ferrite and the grain boundary ferrite is 10% or more,
wherein, in the metallographic structure, the prior austenite grains have an aspect ratio of 3.0 or more, and
wherein a tensile strength in an L direction is 640 N/mm² or more, and a yield strength in an L direction is from 294 to 467 N/mm².

11. The as-rolled K55 electric resistance welded oil well pipe according to claim 7,
wherein the chemical composition comprises, in terms of % by mass, one or more of:
from more than 0 to 0.30% of Cu,
from more than 0 to 0.30% of Ni,
from more than 0 to 0.30%, of Cr,
from more than 0 to 0.10% of Mo,
from more than 0 to 0.10% of V,
from more than 0 to 0.050% of Nb,
from more than 0 to 0.030% of Ti, or
from more than 0 to 0.0100% of Ca, and
wherein, in the chemical composition, the Mn equivalent is from 0.70 to 1.20.

12. A hot-rolled steel sheet used for producing the as-rolled K55 electric resistance welded oil well pipe according to claim 7, the hot-rolled steel sheet having a chemical composition comprising, in terms of % by mass:
from 0.30 to 0.50% of C,
from 0.05 to 0.40% of Si,
from 0.50 to 1.20% of Mn,
from 0 to 0.030% of P,
from 0 to 0.020% of S,
from 0.002 to 0.080% of Al,
from 0 to 0.0080% of N,
from 0 to 0.30% of Cu,
from 0 to 0.30% of Ni,
from 0 to 0.30% of Cr,
from 0 to 0.10% of Mo,
from 0 to 0.10% of V,
from 0 to 0.050% of Nb,
from 0 to 0.030% of Ti,
from 0 to 0.0100% of Ca, and
the balance comprises Fe and impurities,
wherein the Mn equivalent is from 0.50 to 1.20,
wherein a metallographic structure, at a position to which a distance from a sheet surface is ¼ of a sheet thickness in an L cross-section is a ferrite-pearlite structure in which prior austenite grains are flattened, includes grain boundary ferrite which is ferrite present in a grain boundary of the prior austenite grains and intragranular ferrite which is ferrite present within the prior austenite grains, and has a rate of a total area of the grain boundary ferrite and the intragranular ferrite with respect to a total area of the metallographic structure of from 10 to 30%,
wherein, in the metallographic structure, an area rate of the intragranular ferrite with respect to a total area of the intragranular ferrite and the grain boundary ferrite is 10% or more,
wherein, in the metallographic structure, the prior austenite grains have an aspect ratio of 3.0 or more, and
wherein a tensile strength in an L direction is 640 N/mm² or more, and a yield strength in an L direction is from 294 to 467 N/mm².

* * * * *